E. B. MANNING.
Coffee Pot.
No. 105,584.                    Patented July 19, 1870.
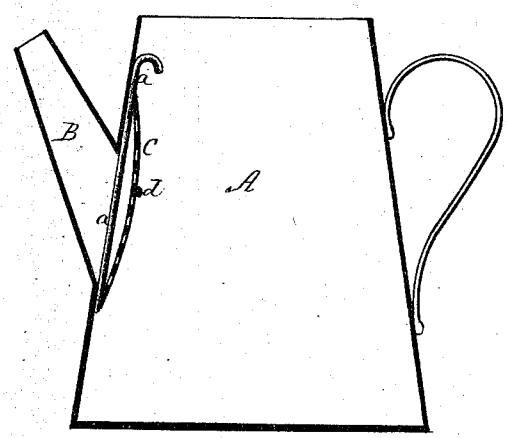
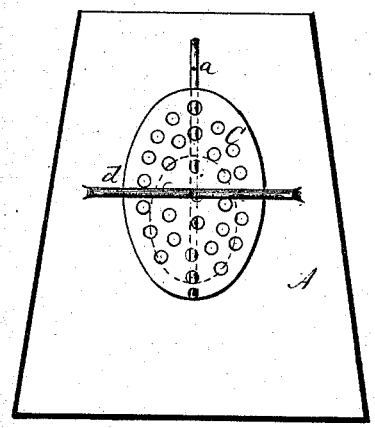 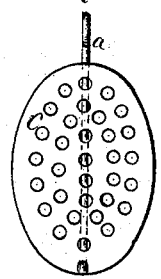
Witnessed.
A. J. Tibbits
J. H. Shumway
Edward B. Manning
Inventor
By his Attorney
John E. Earl

United States Patent Office.

EDWARD B. MANNING, OF MIDDLETOWN, CONNECTICUT, ASSIGNOR TO MANNING, BOWMAN, & CO., OF SAME PLACE.

Letters Patent No. 105,584, dated July 19, 1870.

COFFEE OR TEA-POT.

The Schedule referred to in these Letters Patent and making part of the same.

*To all whom it may concern:*

Be it known that I, EDWARD B. MANNING, of Middletown, in the county of Middlesex and State of Connecticut, have invented a new Improvement in Tea and Coffee-Pots; and I do hereby declare the following, when taken in connection with the accompanying drawings and the letters of reference marked thereon, to be a full, clear, and exact description of the same, and which said drawings constitute part of this specification, and represent in—

Figure 1, a vertical central section through the spout;

Figure 2, a transverse section looking toward the spout; and in

Figure 3, the strainer, detached.

This invention relates to an improvement in the manner of securing the strainer or filter over the spout of tea or coffee-pots, to strain or filter the tea or coffee as it passes from the pot through the spout; and It consists in constructing the strainer from a disk of metal, formed to fit the interior surface of the pot over the spout, and secured by a loop fixed upon the pot, so that the strainer may be taken from the loop whenever required.

A is the pot, and

B the spout, of common construction.

C is a strainer, which consists of a disk of metal made concavo-convex, and formed so as to fit the interior surface of the pot over the spout, and this disk made fast to a vertical rod, $a$, curved at its upper end, so as to form a convenient handle; and to the body of the pot is fixed a wire loop, $d$, extending over the base of the spout, so that the disk may be passed down behind the said loop, as seen in figs. 1 and 2, the loop bearing against the strainer, so as to hold it in place, and yet so as to allow its easy removal when required.

I do not wish to be understood as broadly claiming a removable strainer arranged over the base of the spout of tea or coffee-pots, as such I am aware is not new.

I claim as my invention—

The strainer C, arranged upon the rod $a$, and combined with the loop $d$, fixed to the pot, so as to hold the strainer over the base of the spout, substantially as set forth.

EDWARD B. MANNING.

Witnesses:
A. PUTNAM,
GEO. S. PARMELEE.